June 24, 1958  A. A. GRIFFITH  2,840,325
AIRCRAFT STRUCTURE
Filed Dec. 2, 1952  2 Sheets-Sheet 2
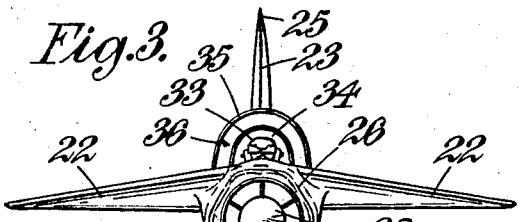
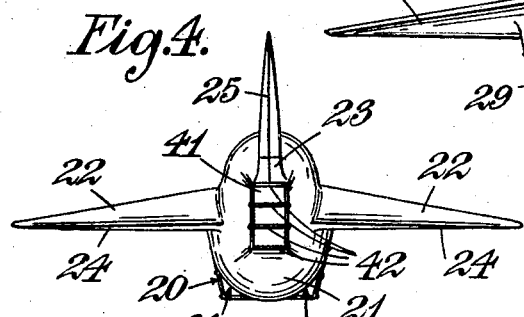
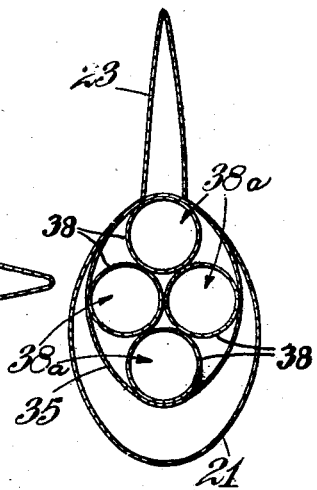
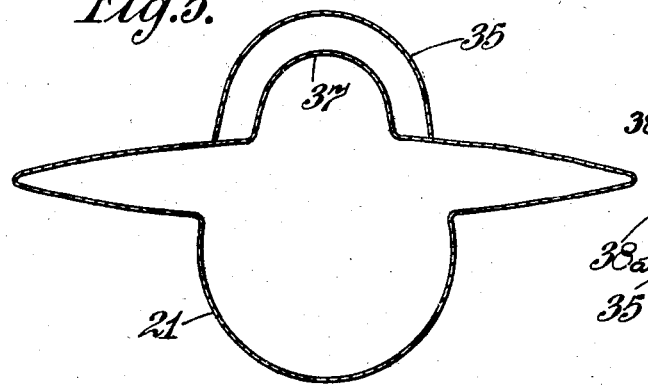
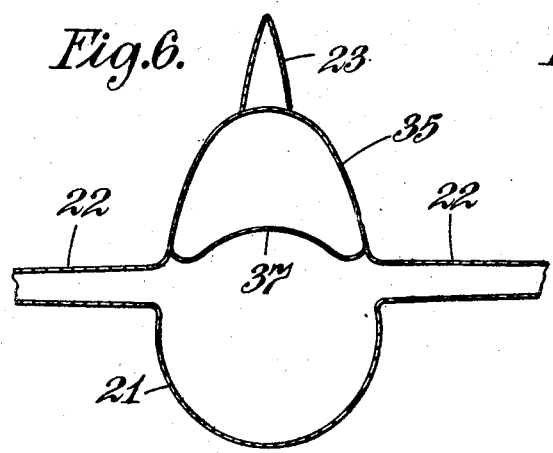
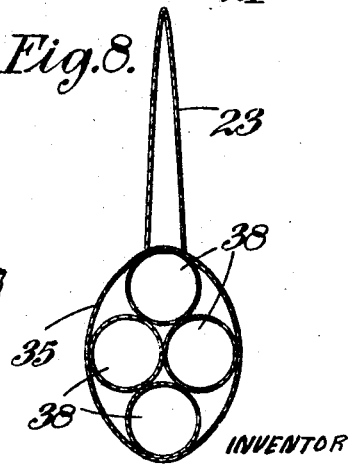
INVENTOR
A. A. GRIFFITH
BY Wilkinson & Mawhinney
ATTYS.

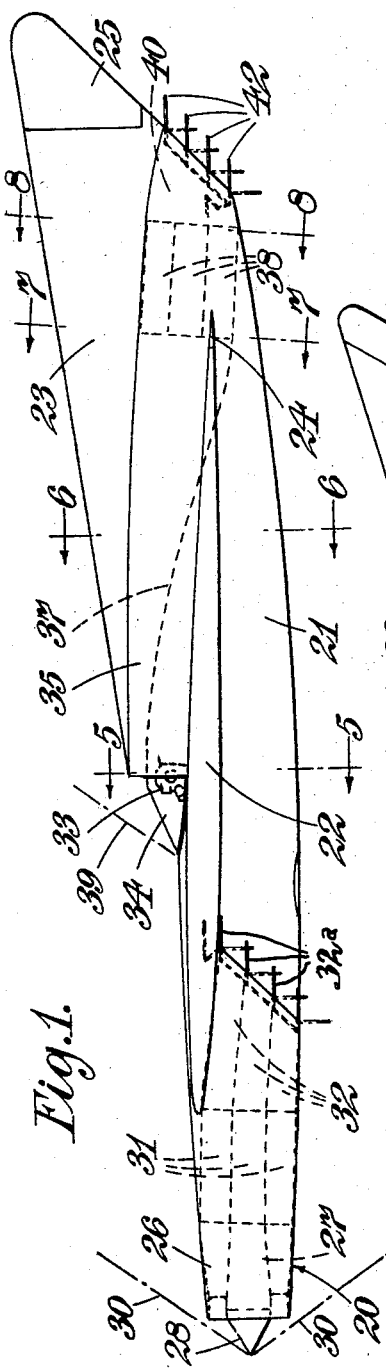

United States Patent Office 2,840,325
Patented June 24, 1958

2,840,325

AIRCRAFT STRUCTURE

Alan Arnold Griffith, Derby, England, assignor to Rolls-Royce Limited, Derby, England, a British company Application December 2, 1952, Serial No. 323,581

Claims priority, application Great Britain December 5, 1951

7 Claims. (Cl. 244—74)

This invention relates to aircraft structures, and is more particularly concerned with aircraft designed for flight at supersonic speeds and powered by air-consuming reaction propulsion means.

The primary object of the invention is to provide an aircraft structure suitable for flight at a supersonic speed in which the aero-dynamic drag attributable to air entry structure for an air-consuming power plant is minimised.

According to the present invention, an aircraft designed for flight at a supersonic speed comprises a fuselage structure which includes a windscreen for pilot accommodation, the windscreen projecting externally from the fuselage structure and having an external surface lying substantially in the surface of a cone intersecting the external skin of the fuselage and disposed with its apex arranged forwardly of its base, and which fuselage structure also includes an air intake structure disposed coaxially with and rearwardly of the windscreen and affording a part-annular air intake which lies within a space bounded by a part-conical shock wave formation created at the intersection of the windscreen with the main fuselage skin when the aircraft is flying at the designed supersonic speed.

Preferably the air intake structure affords an air duct extending rearwardly from the part-annular air intake, which duct gradually changes in cross-section from part-annular to substantially circular or elliptical, and a plurality of air-consuming reaction propulsion engines having forwardly-facing air intakes are accommodated in the fuselage structure rearwardly of the air duct to communicate directly by the forwardly-facing air intakes with the duct.

In aircraft designed for flight at a supersonic speed, it is considered desirable to provide a structure forwardly of an external air intake which causes a shock wave formation extending rearwardly at such angle as to pass outside the outer wall of the air intake structure, and the present invention makes use of the intersection of the windscreen and the skin of the fuselage structure to cause such a shock wave formation.

In accordance with a feature of the invention, deflector means are provided for directing the exhaust gas flow from the reaction propulsion means in the downward sense relative to the direction of flight.

The invention further provides an aircraft structure comprising the combination with a part-annular air intake arrangement as described above, of a forward-facing annular intake and reaction propulsion engine installation as described in the specification of United States Patent No. 2,759,686, granted August 21, 1956.

One preferred embodiment of the invention will now be described as applied in an aircraft designed for flight at supersonic speeds. The description refers to the accompanying drawings in which—

Figure 1 is a side elevation of the aircraft,

Figure 2 is a plan of the aircraft,

Figure 3 is a front view of the aircraft,

Figure 4 is a rear view of the aircraft, and

Figures 5–8 are sections on the lines 5—5, 6—6, 7—7, and 8—8 respectively of Figure 1.

Referring to the drawings, the aircraft comprises a fuselage structure which can be considered to be constituted of two major parts, namely—a forward part 20 which accommodates a first power plant installation and a rearward part 21 affording accommodation for the pilot, fuel tanks, etc., and supporting aerofoil structures, the latter comprising swept-back wings 22 and a vertical fin 23 provided with suitable control surfaces such as ailerons 24 and rudder 25.

The forward fuselage part 20 and its power plant installation are as set forth in United States Patent No. 2,759,686, granted August 21, 1956, and the fuselage part 20 comprises an outer wall structure 26 of substantially tubular form which at its forward end is cylindrical and which gradually changes in cross-section and terminates at its rearward end as wall portions one on each side of the forward end of the rearward fuselage part 21. Co-axially within the outer wall structure there is provided an inner wall structure 27 having at its forward end a conical portion 28 which projects forwardly beyond the outer wall structure 26 with its apex forwardly of an annular air intake 29 defined between the base of the conical portion 28 and the leading edge of the outer wall structure 26. Such a form of intake is considered desirable in case of aircraft designed for supersonic flight, the conical formation creating a shock wave formation (indicated at 30) which extends rearwardly from the apex of the conical portion 28 to lie outside the leading edge of the outer intake wall structure 26.

The conical portion 28 and the inner wall structure 27 rearwardly of it are coaxial with the outer wall structure 26 and the inner and outer wall structures 26, 27 define between them an annular air duct leading rearwards from the air intake 29, which intake duct is of increasing cross-sectional area in the direction of flow of air therethrough, so that diffusion occurs in the duct, the air speeds behind the shock wave formation 30 being subsonic. In the drawings the inner wall structure 27 tapers in the direction of air flow and the outer wall structure increases in internal diameter.

Beyond the rearward end of the annular air duct, there is installed in the outer wall structure a plurality of gas-turbine engines, say six engines 31 are indicated diagrammatically and may be of any convenient type, say of the type having axial-flow compressors. The engines have their axes parallel and are arranged in a ring in the annular space between the inner and outer wall structures 26, 27. The engines are arranged in juxtaposition so that their annular entries together form substantially an annulus which is a continuation of the rear end of the annular intake duct. By this arrangement, air enters the gas-turbine engine compressors without substantial deviation from the direction of flow of air in the annular intake duct.

The forward end of the rearward part 21 of the fuselage structure is joined to the forward part 20 in a manner providing a pair of exhaust exit areas 31a through which the gas-turbine engines 31 exhaust to atmosphere, there being one exit area 31a on each side of the fuselage part 21, each exit area 31a being afforded by the ends of exhaust pipe 32 from some of the engines. The exhaust gas flow from the engines 31 may, when desired, be deflected downwardly with respect to the normal direction of flight by gas flow deflector means which comprise plate-like elements 32a arranged to be pivoted about the edges of the exhaust pipe outlets. The forward part 20 and its power plant may be of any other convenient construction.

The rearward part 21 is the main fuselage structure and is arranged rearwardly of and coaxially with the forward part 20. The rearward part 21 has a forwardly tapering formation 21a between lateral sets of jet pipes 32 from the engines 31, and supports the swept-back wing structures 22. The main fuselage structure affords accommodation for the pilot (33) and houses fuel tanks and operational equipment of the aircraft. The pilot's accommodation includes a windscreen 34 the external surface of which lies substantially in the surface of a cone intersecting the skin of the main fuselage structure 21 and having its axis parallel to the longitudinal aircraft axis and its apex in the skin.

In accordance with the invention, the main fuselage structure also comprises rearwards of and coaxial with the conical windscreen 34, an air duct structure 35 the forward end of which is approximately of semi-cylindrical form and lies approximately in the plane of the base of the cone of the windscreen 34. There is thus formed a part-annular air entry 36 which communicates with an air duct extending rearwardly within the air duct structure 35. The air duct is formed between the inner surface of the duct structure 35 and a fairing 37 extending rearwards from the windscreen 34, and in cross-section the air intake duct increases in area in the rearward direction whereby the duct is of a diffusing nature, even when the aircraft is flying at supersonic speeds since the windscreen 34 is arranged so that the sonic front 39 generated by its apex extends rearwards but passes outside the air entry 36, and since air velocities behind the front are subsonic. The cross-section of the duct also changes gradually from the part-annular at the intake (Figures 3, 5) to elliptical (Figure 7), the major axis of the elliptical section being vertical when the aircraft is in level flight. The wall of the air duct structure 35 changes gradually in section from approximately semi-circular (Figures 3, 5) at the intake 36 to elliptical (Figures 7 and 8) at the rear end and supports the vertical fin 23.

A plurality of reaction propulsion gas turbine engines (say four engines) 38 are accommodated within the elliptical portion of the air duct structure 35. The engines have axial-flow compressors and the forwardly facing compressor air entries 38a receive air directly from the duct within the structure 35, so that there is no substantial change in the direction of air flow in passing from the duct into the engine compressors.

The engines 38 exhaust to atmosphere either through a chamber 40 having a rearwardly-facing outlet 41 to provide reaction propulsion. At the outlet 41 or at the outlet ends of the jet pipes there are provided flap-like deflectors 42 which can be moved about a hinge axis to intrude into the exhaust gas jet or jets, turning the jet or jets through a right angle thus to provide for a vertical lift force on the aircraft.

In combination with the arrangement described in said concurrent patent application, the use of such gas deflectors permits the operation of the aircraft in vertical flight with substantially zero forward speed.

I claim:

1. An aircraft designed for flight at supersonic speed and comprising a fuselage structure which includes a windscreen for pilot accommodation, the windscreen projecting externally from the fuselage structure and having an external surface lying substantially in the surface of a cone intersecting the external skin of the fuselage and disposed with its apex arranged forwardly of its base, and which fuselage structure also includes an air intake structure disposed coaxially with and rearwardly of the windscreen and affording a part-annular air intake which lies within a surface bounded by a part-conical shock wave formation created at the intersection of the windscreen with the main fuselage skin when the aircraft is flying at the designed supersonic speed.

2. An aircraft designed for flight at supersonic speed and comprising a fuselage structure which includes a windscreen for pilot accommodation, the windscreen having an external surface lying substantially in the surface of a cone intersecting the external skin of the fuselage and disposed with its apex arranged forwardly of its base, whereby when the aircraft is in flight at a designed supersonic speed a shock wave formation is created at the intersection of the windscreen with the main fuselage skin, which shock wave formation lies in a conical surface, and which fuselage structure also includes an air intake structure disposed coaxially with and rearwardly of the windscreen and affording a part-annular air intake which lies within the conical surface containing the shock wave formation, said air intake structure affording also a duct within said air intake structure extending rearwardly from said part-annular intake, which duct is correspondingly part-annular adjacent the air intake and gradually changes in cross-section to substantially elliptical at its rearward end, and a plurality of air-consuming reaction propulsion engines accommodated within the fuselage structure and having forwardly-facing air intakes connected to the rearward end of said duct to receive air therefrom.

3. An aircraft as claimed in claim 2, comprising four such air-consuming reaction propulsion engines arranged with their axes parallel to one another and in juxtaposition to be fed with air from said duct.

4. An aircraft designed for flight at supersonic speed and comprising a fuselage structure which includes a windscreen for pilot accommodation, the windscreen having an external surface lying substantially in the surface of a cone intersecting the external skin of the fuselage and disposed with its apex arranged forwardly of its base, whereby a shock wave formation is created at the intersection of the windscreen with the external skin of the fuselage when the aircraft is in flight at supersonic speed, which shock wave formation lies in a part-conical surface, and which fuselage structure also includes an air intake structure disposed coaxially with and rearwardly of the windscreen and affording a part-annular air intake which lies within a space bounded by the part-conical surface containing the shock wave formation, said air intake structure further defining a duct within said air intake structure extending rearwardly from said part-annular intake, which duct is correspondingly part-annular adjacent the air intake and gradually changes in cross-section to substantially elliptical at its rearward end, and a plurality of air-consuming reaction propulsion engines accommodated within the fuselage structure and having forwardly-facing air intakes connected to the rearward end of said duct to receive air therefrom.

5. An aircraft as claimed in claim 4, comprising four such air-consuming reaction propulsion engines arranged with their axes parallel to one another and in juxtaposition to be fed with air from said duct.

6. An aircraft designed for flight at supersonic speed and comprising a fuselage structure which includes a body portion having an external skin, a windscreen for pilot accommodation projecting from said external skin, the windscreen having an external surface lying substantially in the surface of a cone intersecting the external skin and disposed with its apex directed forwardly, whereby at supersonic speeds a shockwave formation is generated which is of conical surface form and has its apex substantially co-incident with the apex of the windscreen, the velocity of the air immediately behind the shock wave thereby being subsonic locally, and the fuselage structure also including air intake structure disposed coaxially with and rearwardly of the windscreen and affording a part-annular air intake opening which extends circumferentially around the base of the part-conical windscreen from adjacent said external skin on one side of the windscreen to adjacent said external skin on the other side of the windscreen, and which lies within the part-conical shockwave formation, whereby the air intake opening lies within the region of local subsonic flow when the aircraft is flying at the designed supersonic speed, and the air intake structure further affording ducting within said fuselage, said ducting extending rearwardly from said part-annular intake opening, and said ducting being correspondingly part-annular adjacent the air intake opening and increasing in cross-section area in the downstream direction to its rearward end, and the aircraft comprising a plurality of air-consuming reaction-propulsion engines accommodated within the fuselage structure and having air intakes connected to the rearward end of said ducting to receive air therefrom.

7. An aircraft designed for flight at supersonic speed and comprising a fuselage structure which includes a body portion having an external skin, a windscreen for pilot accommodation projecting externally of said external skin, said windscreen being of substantially semi-conical external shape and having its apex directed forwardly, whereby in flight of the aircraft at supersonic speed a shock wave formation is created which is of conical surface form and has its apex substantially coincident with the apex of the semi-conical windscreen, the velocity of the air immediately behind the shock wave formation thereby being subsonic locally, and an air intake structure disposed rearwardly of and coaxially with the windscreen and including an outer duct wall which has its forward edge in the plane of and radially-spaced outwards from the base end of the semi-conical windscreen, thereby to define a substantially semi-annular air entry which extends around the base end of the semi-conical windscreen from adjacent the external skin on one side of the windscreen to adjacent the external skin on the other side of the windscreen, the radial spacing of the base end of the semi-conical windscreen and the forward edge of the outer duct wall being selected so that said air entry is wholly within the region of subsonic flow behind said shock wave formation, said air intake structure further defining the duct within said air intake structure, which duct extends rearwardly from the semi-annular air entry and is correspondingly semi-annular adjacent the air entry and increases in cross sectional area in the downstream direction to its rearward end, and the aircraft comprising also a plurality of air-consuming reaction propulsion engines accommodated within the fuselage structure adjacent the reaward end of said duct and having air intakes connected to the rearward end of said duct to receive air therefrom.

References Cited in the file of this patent

UNITED STATES PATENTS

| | | |
|---|---|---|
| 2,370,802 | Klose | Mar. 6, 1945 |
| 2,511,607 | Turnquist | June 13, 1950 |
| 2,557,522 | Vautier | June 19, 1951 |
| 2,589,732 | Riviere | Mar. 18, 1952 |

FOREIGN PATENTS

| | | |
|---|---|---|
| 672,659 | Great Britain | May 21, 1952 |
| 854,894 | Germany | Nov. 6, 1952 |